(12) United States Patent
Lumb

(10) Patent No.: US 8,223,952 B2
(45) Date of Patent: Jul. 17, 2012

(54) ROUTING BASED UPON ORIGIN OF A CALL

(75) Inventor: Anthony Peter Lumb, West Midlands (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1239 days.

(21) Appl. No.: 11/915,663

(22) PCT Filed: May 18, 2006

(86) PCT No.: PCT/EP2006/062411
§ 371 (c)(1),
(2), (4) Date: Nov. 27, 2007

(87) PCT Pub. No.: WO2006/125743
PCT Pub. Date: Nov. 30, 2006

(65) Prior Publication Data
US 2008/0192916 A1  Aug. 14, 2008

(30) Foreign Application Priority Data

May 27, 2005  (GB) .................................. 0510752.9

(51) Int. Cl.
*H04M 7/00* (2006.01)
*H04L 12/66* (2006.01)
(52) U.S. Cl. ............... 379/221.14; 370/352; 379/221.01
(58) Field of Classification Search ............. 379/221.01, 379/221.08, 221.14; 370/352–356
See application file for complete search history.

(56) References Cited

U.S. PATENT DOCUMENTS

| 6,870,841 | B1 | 3/2005 | Brown et al. |
| 2002/0075849 | A1 | 6/2002 | Tarle et al. |
| 2002/0167943 | A1* | 11/2002 | Hakim et al. ................. 370/356 |
| 2003/0123436 | A1 | 7/2003 | Joseph et al. |
| 2004/0114613 | A1 | 6/2004 | Mercuriali et al. |

FOREIGN PATENT DOCUMENTS

| EP | 0 928 095 | 7/1999 |
| JP | 2003281005 A | 10/2003 |
| WO | 01/43395 | 6/2001 |

OTHER PUBLICATIONS

Faltstrom, P. et al. "The E.164 to Uniform Resource Identifiers (URI) Dynamic Delegation Discovery System (DDDS) Allocation (ENUM)." IETF RFC3761, Apr. 2004, XP015009541.

* cited by examiner

*Primary Examiner* — Harry Hong
(74) *Attorney, Agent, or Firm* — Coats & Bennett, P.L.L.C.

(57) ABSTRACT

The invention relates to a data communications network and a method of operation thereof. A data communications network (14) is described which includes a call server (58, 60, 62, 64) for the purpose of signalling, and a routing server (66, 68) for the purpose of routing to permit communication between users of the network. The call server (58, 60, 62, 64) is operable to send a request to the routing server (66, 68) for the purpose of obtaining the identity of another call server (58, 60, 62, 64) to which it is required to communicate. The request is provided with a parameter which relates to the origin of the communication within the data network (14) to enable a desired routing of the communication through the network.

23 Claims, 2 Drawing Sheets

ROUTING BASED UPON ORIGIN OF A CALL

The invention relates to a communications network, and a method of operating a data communications network.

A Public Switched Telephony Network (PSTN) typically has a hierarchy of switching nodes. Subscribers are connected directly or indirectly to switching nodes known as Local Exchanges (LEs) or Class 5 switches. When a subscriber connected to such a node makes a telephone call, the destination of the call is represented in the form of a number. ITU Recommendation E.164 describes the structure of these numbers, which are well understood throughout the world. A typical such number is +44 24 76562000 which indicates the identity of the called subscriber. To reach the called subscriber the LE must decode the number in order to route the telephone call towards its ultimate destination. Typically in all but the smallest existing switching networks there is insufficient capacity at the LE to be able to find an explicit route directly to every possible final destination by analysing all possible telephone numbers in the network. Hence the hierarchy of switching nodes is required to enable telephone calls to be routed step by step towards the final destination.

A LE may have circuits connected to a plurality of other nodes, which comprise a subset of the total number of nodes in the network. Connections may be to other LEs which are geographically close, or to nodes which are at a higher level in the switching hierarchy. Nodes at the next layer in the hierarchy are commonly referred to as Trunk Exchanges (TEs) or Class 4 switches.

In this manner the capacity to decode telephone numbers necessitates the network hierarchy. The hierarchy is also required due to the nature of Time Division Multiplex (TDM) connections, or routes, which are essentially point to point. This means that it is extremely inefficient to try to create a direct connection known as a full mesh between all LEs. This represents a limitation imposed by topological constraints.

A typical telephone call in such a TDM network originates at a LE. The LE will analyse the dialled digits by decoding them and may discover that the destination does not lie within its own node, or any of the other LEs to which it is directly connected. This decoding function is typically simplified by arranging that telephone numbers are allocated to nodes in large contiguous ranges, usually blocks of 10,000 numbers. Many telephone numbers are constrained to be within geographic areas by the use of area codes. The arrangement of telephone numbers into structured blocks is known as a numbering plan. If the destination of the telephone call is not local, then the LE simply directs the call to one of a small number of TEs to which it has circuit connections.

At a TE, the dialled number must also be analysed. Again there is typically insufficient capacity at the TE to analyse all possible telephone numbers within the network. Instead, the structured arrangement of the numbering plan means that the TE is only required to decode a small part of the number, typically the area code plus one or two additional digits. This will identify another TE which is in the required geographic area for moving the call towards the destination. Having identified a suitable next-hop TE the call is directed towards it. The next TE in the chain will again decode the dialled digits in order to identify how to further route the call onward. This process will continue until a TE is reached which has a direct connection to the destination LE.

There may be many layers of hierarchy within a large PSTN such that higher levels of exchange exist above the network of TEs. The international switching network is one of these higher levels. Another feature of PSTN networks is the need to interconnect with networks of different operators. This is an essential feature of telecommunications between different countries. There may be many points of interconnect between two operators who are both offering service within the same country. Complex agreements are negotiated between operators to ensure that interconnects are used efficiently, with load being shared evenly between the different points of interconnect. Operators wish to ensure that calls which are destined to terminate within another operator's network can be routed according to their own policy. For example an operator may wish to carry a call as far as possible within their own network, in order to minimise the charges levied by the other operator. An example of this policy would be a call originated by a subscriber belonging to one network operator which will terminate in the network of a second operator. Alternatively, it may be beneficial for an operator to route a call such that it minimises the use of that operator's own network. An example of this policy would occur in a country where subscribers have the ability to select another network operator to carry long distance calls which is known as carrier selection. Many countries have regulatory regimes which mean that either of these policies can apply, each to certain categories of call.

Many telecommunications operators are now looking towards the Next Generation Network (NGN) technologies. These are typically based upon Internet Protocol (IP) networks, where IP routers have replaced the traditional TDM switches. NGNs offer many advantages by offering the possibility to run many different services, in addition to voice telephony, over the same underlying IP network.

Within NGN telephony the connections are controlled by Call Servers (CSs) which control the point at which the call originates. The CSs perform many of the functions previously supplied by the traditional TDM switches, but further offer the possibility of additional features such as multimedia connections, personalisation of services and mobility. It is a feature of NGNs that the network topology is not as hierarchical as TDM networks and has a predominantly flat structure. An IP network enables virtual connections to be created between all endpoints without the inefficiencies associated with TDM networks and their associated topology. In IP networks there is no need for a hierarchy at the bearer layer, and there is consequently a desire to remove the hierarchy at the signalling layer as well. This leads to the requirement for what is known as Source Based (SB) routing which provides the ability to determine the ultimate destination for a call within the confines of an operator's IP network at least at the CS.

It is feasible with modern server architecture to design each CS in the NGN to have the capacity to decode all possible destination numbers. However, this is still undesirable because each time a new subscriber is added or moved it would require the routing data in every CS to be updated simultaneously. An alternative has been to move towards Centralised Routing Servers (CRSs) which contain the full decode data for routing calls and which are accessed by the CSs when necessary.

One implementation of such a CRS is based upon the Domain Name System described in the IETF document RFC 1034, and is known as ENUM, described in the IETF document RFC 3761. ENUM describes a mechanism where an E.164 number is converted into a domain name which can then be input to a Domain Name Server (DNS). The DNS then returns a Universal Resource Identifier (URI) to identify the CS which can connect to that number. Use of URIs is described in the IETF document RFC 2396. A URI contains the domain name of the destination CS within it. The domain name can be used to find the IP address of the CS by making a second access to the DNS. Knowing the IP address of the destination CS enables signalling messages to be sent directly to it from the originating CS.

A problem with the existing CRS arrangement is that the lookup to find the destination is based only upon the identity of the called party i.e. the destination E.164 telephone number. There are circumstances within many NGNs where it would be advantageous for the destination for a call within the network to depend upon the origin of the call. In particular, whenever the NGN is required to interact with legacy TDM networks, some form of selective routing based upon the origin of the call would be advantageous.

The present invention aims to solve the problems of the known arrangement. What is required is a system which permits calls to be routed most efficiently and cost effectively through a communications network.

Accordingly, embodiments of the present invention provide a data communications network.

Such an arrangement provides the technical solution of being able to route the communication based on the knowledge of where the communication originated. This has the advantage that the communication can be routed through the network with a greater degree of control based on the customer and/or network operator requirements.

Embodiments of the present invention further provide a method of operating a data communications network.

Other features of the invention will be apparent from the following description of a preferred embodiment shown by way of example only in the accompanying drawings, in which.

Figure 1:
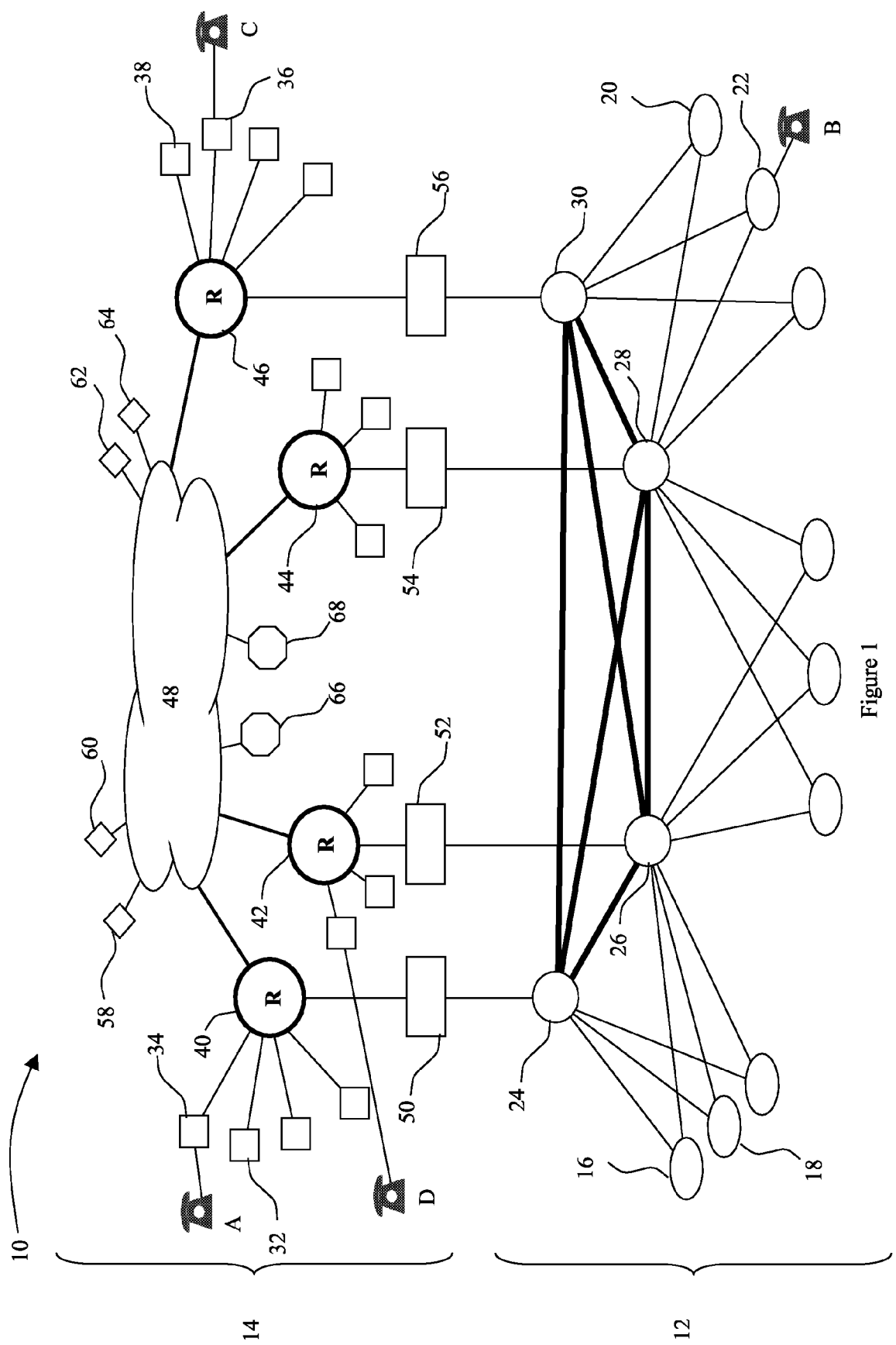
FIG. 1 is a schematic diagram of the architecture of an evolved communications network to illustrate how the invention according to an embodiment of the present invention is put into effect.

The advantages conveyed by the embodiment of the present invention shown in FIG. 1 are best described by considering some example call scenarios in an evolved telephony network. FIG. 1 illustrates one possible architecture of such a network, generally designated 10. A traditional Time Division Multiplexed (TDM) network 12 is shown in the lower part of FIG. 1 and a Next Generation Network (NGN) 14 is shown in the upper part of FIG. 1. The TDM network 12 consists of Local Exchanges (LEs) 16, 18, 20, 22 connected to Trunk Exchanges (TEs) 24, 26, 28, 30. Each LE is connected to a small number of TEs whereas subscribers are typically connected to only a single LE.

The NGN 14 consists of a plurality of Access Gateways (AGs) 32, 34, 36, 38 which are connected to Edge Routers (ERs) 40, 42, 44, 46. The ERs are in turn connected together by a core data network 48 which enables data packets of the NGN 14 to be sent from one ER to another. The data network 48 will typically be based upon the Internet Protocol (IP) but may also make use of other data transport technologies such as the Asynchronous Transfer Mode (ATM) protocol. It will be appreciated that the ERs 40, 42, 44, 46 are the first point within the network topology where it is possible for a choice of routing to be made. The function of the ERs 40, 42, 44, 46 may be considered as a routing switch for selective routing of a communication through the network.

The AGs may be located within the network operator's premises and connected to the telephone lines which have traditionally connected subscribers at their LE. Alternatively within NGNs, the AGs may be located within the customer's premises and be connected to the ERs by a data connection such as xDSL, cable networks or metro Ethernet.

The TDM network 12 and the NGN 14 shown in FIG. 1 are connected together by Trunk Gateways (TGs) 50, 52, 54, 56. Trunk Gateways provide the capability to convert the data carried in the NGN 14, which will typically be carried in IP packets or ATM cells, into the equivalent data carried in TDM circuits or DS0s carried in E1s, T1s and all appropriate higher order multiplexes. For example, in a typical evolved network 10, the interface from the TG to the TDM network 12 will be a Synchronous Transport Module Level 1 (STM1) or Optical Carrier Level 3 (OC3). The interface from the TG to the data network 48 will typically be STM1/OC3 or Gigabit Ethernet.

Call Servers (CSs) 58, 60, 62, 64 are shown with connections to the data network 48 for the purpose of signalling to and from the AGs and TGs as required. The CSs may be geographically remote from the AGs and TGs which they control. Centralised Routing Servers (CRSs) 66, 68 are also shown connected to the data network 48. Many CRSs are provided within the NGN 14 in order to afford resilience. The CSs make requests to the CRSs in order to find the identity of the CS to which they must communicate in order to initiate a communication between two subscribers.

A feature of such an evolved network 10 is that there are a plurality of alternate paths between the TDM network 12 and the NGN 14. Each of these two networks could span a large geographic area such as a country or a continent. The TGs 50, 52, 54, 56 are located strategically around the whole geographic area in order to enable data flows such as telephone calls to be routed in the most cost effective manner, by optimising the use of resources in each network 12, 14.

In the arrangement of FIG. 1 the two networks 12, 14 may be owned by the same network operator, but they may alternatively be owned by different operators. In the latter case, each operator will seek to route data flows such as telephone calls in ways which minimise their costs and hence optimise revenues. A network operator may own a TDM network 12 and an NGN 14, but may also be obliged to have interconnects via TGs to the TDM network (12) and/or data networks 48 of other, rival, operators who may compete to carry certain types of data flows such as long distance telephone calls.

In the case where two operators each have a data network 48, the TGs which join the two networks together may be 'packet to packet' gateways whereby there is no conversion to TDM. The beneficial features of the described embodiment of the present invention apply equally to such a situation.

An example of how a call is made according to an embodiment of the invention is now provided. Referring to FIG. 1, and considering a telephone call which originates from subscriber A, connected to AG 34. Subscriber A dials the telephone number associated with Subscriber B, who is connected to LE 22 in the TDM network 12. The CS 58 which controls AG 34 will receive the identity (e.g. telephone number) of subscriber B from subscriber A. CS 58 will send this identity to one of the CRSs 66, 68. The CRS has to find a suitable route for the call to take. In the example network 10 shown in FIG. 1 there are four possible routes corresponding to the four TGs 50, 52, 54, 56. In a real life network there may be typically tens or hundreds of possible routes.

The optimum route between A and B may depend upon many factors. In the situation where the same operator owns both the NGN 14 and the TDM networks 12 there may be a policy to route calls as far as possible within the NGN 14, because the TDM network 12 is overloaded and the NGN 14 has been added to provide additional capacity. In this case the TG 54, 56 would provide the optimum route. Within a CRS according to the prior art, which only uses the destination identity for the purpose of finding the route this policy can be accommodated. This is because an ER will always return the same result regardless of the origin of the call. In this first example call, the optimum answer would generally be the same for a call originating anywhere in the NGN 14. For example, the optimum route for a call from subscriber D to B would still involve the use of TG 54 or 56. However, in the case of a call from subscriber C to B, there would be a clear advantage to use TG 56 before TG 54 because there will be significantly lower utilisation of the NGN 14. In order to be able to indicate a preference for TG 56 over TG 54, it is necessary for the CRS 46 to have knowledge of the origin of the call.

In another similar situation, considering the example A calls B where the operator owns both the NGN 14 and the TDM network 12 there may be an economic advantage to carry telephony traffic over the legacy TDM network 12 as much as possible. For example, when the existing TDM network 12 still has sufficient capacity and the operator wishes to prioritise use of the NGN 14 for new multi-media services. In this situation for the call from A to B, the optimum route would be via TG 50. In this situation, the optimum route will be very dependant upon the origin of the call. In a further example a call from D to B would be best routed via TG 52.

Another example referring to FIG. 1 will serve to further illustrate the advantages conveyed. Consider a call from subscriber A to subscriber C which is a long distance call. In this scenario, the TDM network 12 belongs to another operator and the subscriber A has selected this other operator to carry their long distance calls. The CS 58 which controls AG 34 will receive the identity (e.g. telephone number) of subscriber C from subscriber A. In this case CS 58 will identify this as a long distance call to be carried by the other operator, and apply to the CRS for a route to that operator. This is typically achieved by appending extra "routing digits" to the number dialled by the subscriber before applying to the Routing Server. These extra digits relate to a destination in the TDM network (12). In this example the optimum routing strategy for the first operator will be to send the call via TG 50 because it is nearest in respect of the data network topology to the AG 34. In turn, the other operator would require to find a route which would take the call as far geographically as possible before returning the call to the first operator, this is a traditional TDM routing function.

Figure 2:
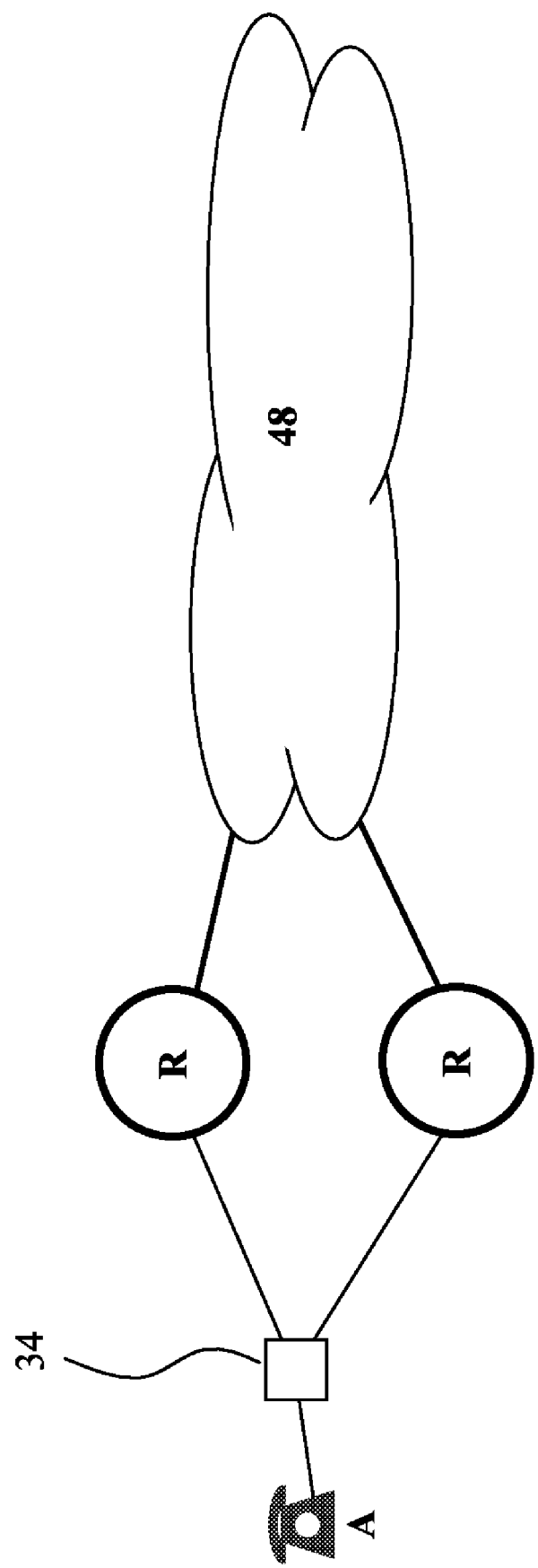
FIG. 2 is a schematic diagram of part of an evolved network.

It is clear from the examples above that there are many situations where the operator of a NGN 14 will require to route connections based upon the origin of the call and not just the destination. Within the prior art it is known that calls may be routed in a TDM network 12 based upon the origin of the call where the origin is represented by the telephone number of the originating line. This is known as Originating Line Identity (OLI). However within a NGN 14 it will also be advantageous to route based upon the origin of the call where the origin is represented by the identity of a node within the NGN 14 topology. It might be considered that the identity of this node could be inferred from the OLI of the originating subscriber, because there may be a fixed relationship between the subscriber and the ER to which his AG is connected. However, there are several reasons why this relationship will not hold true in a NGN 14. Firstly, the AG may be connected to more than one ER in order to provide resilience to failures. This arrangement is illustrated in FIG. 2 whereby a particular ER which is used may change on a call by call basis. Also, a common feature of NGNs 14 is mobility. The AG could be built into a laptop computer, and access to the data network 48 may be achieved from almost anywhere.

According to the different examples of the invention the origin of a call can be represented in two different ways. Firstly, the origin of a call can be represented by the identity of the originating line. This identity takes the form of the telephone number of the originator of the call, but could take other forms which are meaningful to the network operator such as a number of an item of equipment. Secondly, the origin of a call within a NGN can be represented by the point of origin within the data network topology. In an IP network this would typically be the identity of an ER, but it may also be the identity of a TG which connects the NGN 14 to the legacy TDM network 12.

A detailed description of how the origin of a call is identified within the ENUM protocol is now provided. According to one embodiment of the invention an adaptation of an existing mechanism for sending queries to a CRS known as ENUM, described in the IETF document RFC 3761 is used.

The known ENUM algorithm is fully described within RFC 3761 and summarised here. To call the number +44 24 76562000 using the ENUM protocol in the following steps are required to be performed by the known arrangement.

1. Taking an E.164 telephone number e.g. +44 24 7656 2000.
2. Removing all non-digit characters except "+" i.e. +442476562000
3. Removing the "+" sign i.e. 442476562000
4. Putting dots between each digit i.e. 4.4.2.4.7.6.5.6.2.0.0.0
5. Reversing the order of the digits i.e. 0.0.0.2.6.5.6.7.4.2.4.4
6. Appending the string ".e164.arpa" i.e. 0.0.0.2.6.5.6.7.4.2.4.4.e164.arpa The resulting string is a domain name which can be used in a query to a CRS based upon the DNS protocol (RFC 1034). In this process, the results returned from the server take the form of DNS records which contain the identity or identities of the destination for the call.

According to an embodiment of the invention a modification of the existing mechanism described above is provided by including two additional parameters to the domain name generated above. The first parameter identifies the location of the origin of the call in terms of the NGN 14 topology and will be represented by the label TLI (Topology Location Identifier). The second parameter identifies the origin of the call in terms of the Originating Line Identity of the calling subscriber, and will be represented by the label OLI.

In this manner the domain name generated in step 6 above will become OLI.TLI.0.0.0.2.6.5.6.7.4.2.4.4.e164.arpa which can be used in a query to a CRS based upon the DNS protocol. By adding the additional parameters to the domain name, it becomes possible for the CRS to modify the returned result based upon the origin of the call. In DNS terminology, the text between the dots in a domain name are referred to as labels. This example refers to the ENUM protocol, but the concept of including the two additional location parameters is equally applicable to other protocols which could be used to access a CRS.

It will be appreciated that in known data networks the identify of the caller is known to the call server 58, 60, 62, 64 but that this identity is not passed on to further entities within the network. Such an identity of the caller may be used for billing purposes.

The invention claimed is:
1. A data communications network comprising:
  a routing server configured to route communications between users of the network; and
  a first call server configured to send a request to the routing server to obtain an identity of a second call server with which the first call server is required to communicate, the request including a parameter that identifies an origin of a communication within the data network, and that is used to route the communication through the data network.

2. The data network of claim 1 wherein at least a portion of the parameter identifies a routing switch associated with the origin of the communication.

3. The data network of claim 1 wherein at least a portion of the parameter identifies a line identity associated with the origin of the communication.

4. The data network of claim 3 wherein the line identity comprises a telephone number of a calling party originating the communication.

5. The data network of claim 3 wherein the line identity corresponds to an item number that identifies a piece of telephony equipment.

6. The data network of claim 1 wherein the data network is configured to communicate with a public switched telephone network (PSTN).

7. The data network of claim 6 further comprising at least one trunk gateway configured to communicatively interconnect the data network and the PSTN.

8. The data network of claim 1 further comprising at least one access gateway configured to provide access to the data network.

9. The data network of claim 8 wherein the at least one access gateway comprises a mobile unit.

10. The data network of claim 8 wherein the at least one access gateway comprises a Multi Service Access Node (MSAN).

11. The data network of claim 1 wherein the data network is configured to communicate data according to an Internet Protocol (IP).

12. The data network of claim 1 wherein the data network is configured to communicate data according to an Asynchronous Transfer Mode (ATM) protocol.

13. A data network of claim 1 further comprising a plurality of routing servers.

14. A method of operating a data communications network having a first call server and a routing server, the method comprising:
sending a request from the first call server to the routing server to obtain an identity of a second call server that is required to communicate with the first call server, the request including a parameter that identifies an origin of a communication within the data communications network; and
routing, by the routing server, the communication through the data communications network from the first to the second call server based on the parameter that identifies the origin of the communication within the data communications network.

15. The method of claim 14 wherein the parameter comprises a Topological Location Identifier (TLI) label, and wherein the method further comprises using the TLI to identify a routing switch associated with the origin of the communication.

16. The method of claim 15 wherein the parameter further comprises an Originating Line Identifier (OLI) label, and wherein the method further comprises using both the TLI and the OLI to identify the origin of the communication.

17. The method of claim 14 further comprising identifying the origin of the communication as a label within a domain name based on an Electronic Numbering (ENUM) protocol.

18. The method of claim 15 wherein sending a request to the routing server comprises sending the domain name as the request to the routing server according to the Domain Name Server (DNS) protocol.

19. The method of claim 18 further comprising receiving one or more DNS records in response to the request, the one or more DNS records comprising one or more identities of a destination for the communication.

20. The method of claim 14 wherein the data network is configured to communicate with a public switched telephone network (PSTN).

21. The method of claim 14 wherein the data network communicates data according to an Internet Protocol (IP).

22. The method of claim 15 wherein the data network communicates data according to an Asynchronous Transfer Mode (ATM) Protocol.

23. The method of claim 15 further comprising routing communications between users of the network using a plurality of routing servers.

* * * * *